Apr. 17, 1923.                                                              1,452,038
R. GOLDSCHMIDT
MECHANISM FOR CONVERTING ROTARY INTO OSCILLATORY MOTION
Filed May 27, 1921                                  3 Sheets-Sheet 1
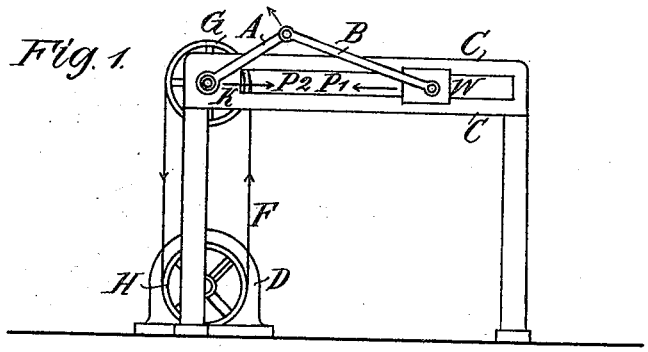
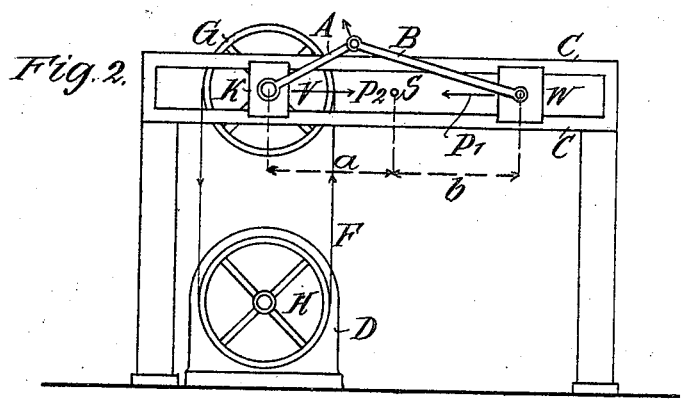
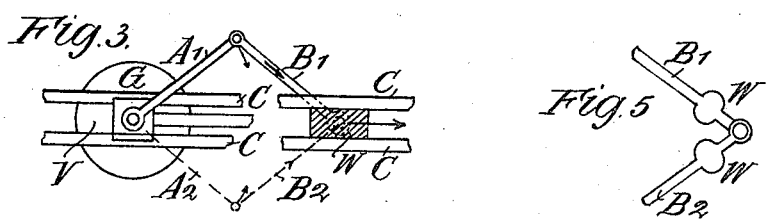 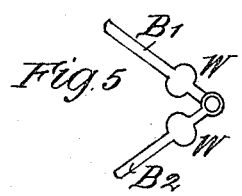
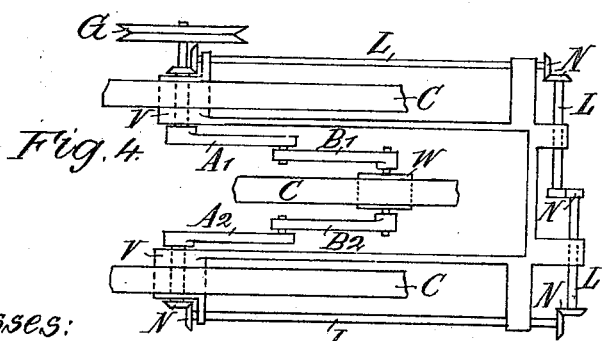
Witnesses:
Emil Kayser
Rasimir Nagell
Inventor:
Rudolf Goldschmidt
By Watson, Coit,
Morse & Grindle,
Attorneys Apr. 17, 1923.
R. GOLDSCHMIDT
1,452,038
MECHANISM FOR CONVERTING ROTARY INTO OSCILLATORY MOTION
Filed May 27, 1921     3 Sheets-Sheet 2
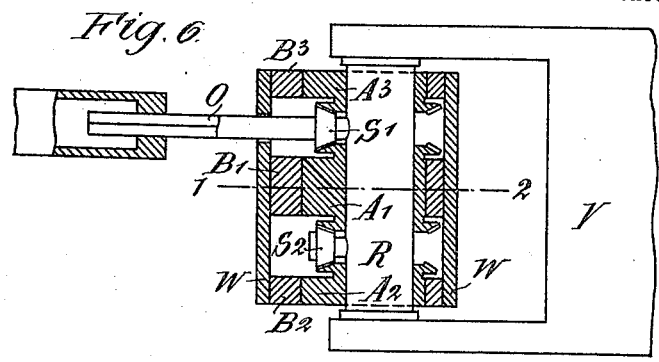
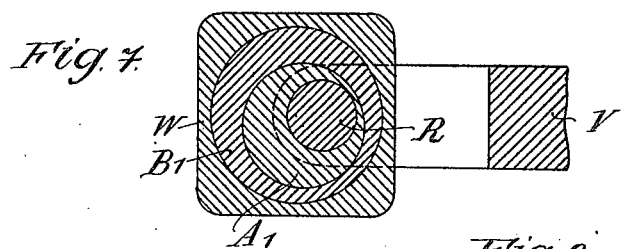
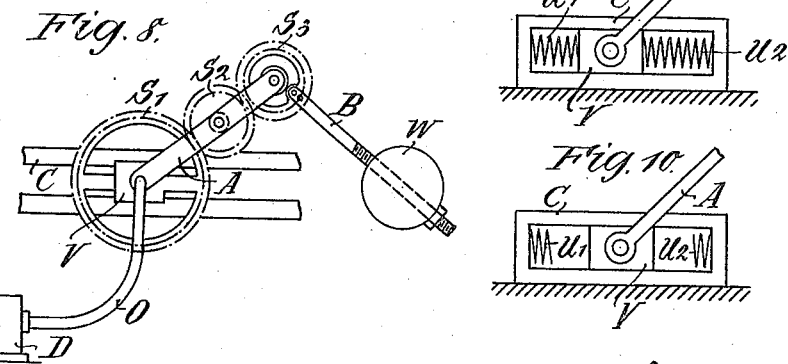
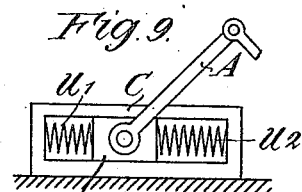
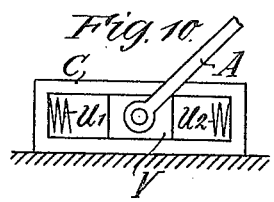
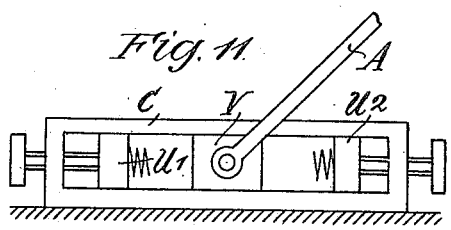
Witnesses:
Emil Kayser
Kasimir Mazell
Inventor:
Rudolf Goldschmidt
by Watson, Cost,
Morse & Grindle,
Attorneys.

Apr. 17, 1923. 1,452,038
R. GOLDSCHMIDT
MECHANISM FOR CONVERTING ROTARY INTO OSCILLATORY MOTION
Filed May 27, 1921  3 Sheets-Sheet 3

Witnesses:
Emil Kayser
Rasimir Nagell

Inventor:
Rudolf Goldschmidt
by: Watson, Coit,
Morse & Grindle
Attorneys.

Patented Apr. 17, 1923.

1,452,038

UNITED STATES PATENT OFFICE.

RUDOLF GOLDSCHMIDT, OF BERLIN, GERMANY, ASSIGNOR TO DET TEKNISKE FORSØGSAKTIESELSKAB, OF ORDRUP, CHARLOTTENLUND, DENMARK, A COMPANY OF DENMARK.

MECHANISM FOR CONVERTING ROTARY INTO OSCILLATORY MOTION.

Application filed May 27, 1921. Serial No. 473,033.

*To all whom it may concern:*

Be it known that I, RUDOLF GOLDSCHMIDT, a German citizen, residing at 45 Linden Allee, West End, Berlin, Germany, have invented new and useful Improvements in Mechanism for Converting Rotary into Oscillatory Motion, of which the following is a specification.

The present invention relates to the production of oscillatory motion from rotary motion and has for its object to utilize the forces set up during the acceleration and retardation of the masses.

In order that the invention may be more clearly understood, reference is hereinafter made to the accompanying drawings whereon:—

Fig. 1 is a side view of a known arrangement.

Fig. 2 illustrates a modification thereof according to the present invention.

Fig. 3 is a partial side view and Fig. 4 a plan of a modified arrangement.

Fig. 5 is a detail view of a modification.

Fig. 6 is a sectional view of one form of the present invention employing excentrics.

Fig. 7 is a view of the same in section on the line 1—2 of Fig. 6.

Fig. 8 illustrates a further form of the invention.

Figs. 9, 10 and 11 show three different arrangements for determining the path of reciprocation.

Figs. 12 and 13 are curves or graphical representations hereinafter referred to.

Figure 12:
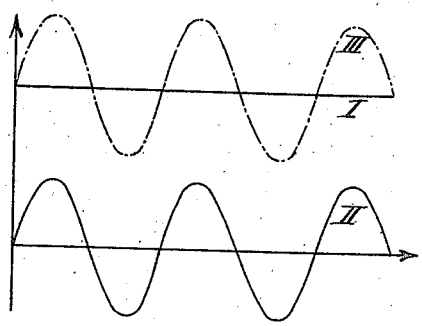

Referring to Fig. 1 of the drawings, which represents a common arrangement for converting rotary into reciprocatory motion, K represents a crank bearing, A a crank and B a connecting rod. The crank A is driven from the motor D by means of belt pulleys G. H. and a belt F. In this hypothetical illustration, it is assumed that the apparatus is not performing work, but merely effecting the free reciprocation of a crosshead W sliding between the guides C. If the crosshead W is of considerable weight, a substantial force $P^1$ will be necessary for its acceleration and retardation. This force corresponds with an equal reaction $P^2$ which is set up in the crank bearing K. The forces $P^2$ are in turn absorbed by the machine frame.

Referring now to Fig. 2, the apparatus is so arranged that the crank bearing K is not fixed to the frame, but is connected with a slide block V which can also reciprocate between the guides C so that the periodic reacting forces $P^2$ cause the slide block V to oscillate in a similar manner to the oscillation of the crosshead W. If the masses of the two sliding bodies V and W are represented respectively by $M^1$ and $M^2$, the path of reciprocation of the two bodies will be in inverse proportion to the masses. Movement is dependent on the well-known physical law that the centre of gravity remains stationary. If S be assumed to be the common centre of gravity of the two bodies V and W at distances represented by $a$, $b$ respectively therefrom, then at any moment, $M^1 \times a = M^2 \times b$.

As the slide block V may be connected to any reciprocatory element, such as a hacksaw whereby the reacting forces act upon the freely movable crank bearing, the driving means may be aptly termed a reaction driving gear.

The direction of the travel of the belt at right angles to the path of reciprocation is intentionally selected in order that, if the belt is sufficiently long, the sliding movement shall be affected as little as possible. It will be understood that instead of using a belt drive, any other suitable driving mechanism may be employed which will not interfere with the oscillation, as for example, a square shaft, flexible shaft or Cardan shaft.

Figs. 3 and 4 illustrate a modification of the arrangement shown in Fig. 2 in which the crosshead W is driven by means of two cranks $A^1$ and $A^2$ and their connecting rods $B^1$ and $B^2$, shafts L and gearing N being provided in order that the two cranks $A^1$ and $A^2$ may rotate at the same angular velocity in opposite directions. In this manner the lateral stresses set up on the guides C by the crosshead W are counter-balanced. It is then possible to dispense with the guides C for the crosshead W.

In Figs. 3 and 4 the cranks $A^1$ and $A^2$ are also equal in length to the connecting rods B¹ and B² and the apparatus is so arranged that the crosshead W can travel past or between the slide blocks V. The sphere of action is thus equal to four times the length of the crank instead of being twice the length of the crank in cases where the connecting rod is longer than the crank.

Fig. 5 is a diagrammatical illustration showing how the mass of the crosshead W may alternatively be integral with the connecting rods B¹ and B².

The construction of the connection between the crosshead W or its equivalent and the slide block V may be of any preferred type such as link mechanism, excentrics, parallel or elliptical link motion, lazy tongs or the like.

Figs. 6, 7 and 8 illustrate practical constructions thereof.

In Figs. 6 and 7 the crank and connecting rod are replaced by excentrics thereby forming a compact and strong construction. The slide block V is formed with a yoke and crosspin R upon which the excentrics A¹, A² and A³ are rotatably mounted within excentrics B¹, B², and B³ respectively. The excentrics A¹, A² and A³ replace the cranks hereinbefore referred to whilst the excentrics B¹, B² and B³ replace the connecting rods. In the appended claims I wish it to be understood therefore that the term "crank mechanism" is intended also to include an arrangement of excentrics such as herein illustrated. The mass of the reciprocating weight W is in this case mounted upon the excentrics B¹, B² and B³, but is supplemented also by the weight of the excentrics A¹, A², A³ and B¹, B² and B³. The excentrics A² and A³ are rotated in the same direction while the excentric A¹ is rotated in the opposite direction thereto by means of bevel pinions S¹ and S² and a driven shaft O which is of square section to slide within the driving member. The displacement of the mass in this case is equal to twice the sum of the radius of excentricity of the excentrics A¹ and B¹.

Fig. 8 shows an arrangement for the displacement of the reciprocating mass W by means of planet gearing. The sun wheel S¹ is fixed upon the slide block V and the planet wheel S² is carried by a crank A. The outer planet wheel S³ is likewise rotatably carried on the crank A and is fixed to the connecting rod B which carries the reciprocating weight W. The radii of the sun wheel S¹ and planet wheel S³ may be assumed to be in the proportion of 2 to 1. The weight W will then reciprocate in a horizontal path. In this case the rotation of the crank A is effected from the motor D through the medium of a flexible shaft O.

As hereinbefore described, the movement of the body V relative to the body W is determined, but there is no fixed conjoint movement nor is the location of the movement within the guides determined. The bodies V and W apart from their oscillations, can assume any desired position so far as the flexibility of the driving mechanism will permit.

There may be either constant reciprocation about a fixed point, variability of the location and amplitude of the oscillations or continuous displacement of the centre of oscillation.

In order to obtain oscillation about a fixed point, the body V may be located between two springs U¹ and U² as in Fig. 9, these springs being alternatively compressed during the reciprocatory movement. Alternatively a single spring adapted both for compression and extension may be adopted or, as illustrated in Fig. 10, the body V may strike against buffers U¹ and U². Instead of employing spiral springs as illustrated in the drawings, it will be understood that any form of resilient means may be employed such as blade springs or the like. When the oscillation takes place continuously over a predetermined path, the centre of oscillation remaining constant, the reaction driving gear substantially replaces the crank. It has, however, the advantage that at any moment the accelerating and retarding forces of the bodies V and W counter-balance each other, apart from the useful work done, so that the system is completely balanced. There may be cases in which no frame is provided in proximity to the reciprocating body in which case the body will have no fixed guide as in the case of guide C in Fig. 2. In such case the body V must rebound against the body W.

Such a case may occur, for example, if a mechanism such as that shown in Fig. 8 is mounted at the free end of the wing of a vibrating wing flying machine in which the wing is mounted to oscillate about a fixed point on the frame of the machine so that the body W reciprocates in a vertical or inclined path. The crank A mounted at the end of the wing may then be driven by means of a shaft mounted in the wing and extending outwardly therefrom.

The advantages of the mechanism become especially apparent if the specific qualities are to be utilized which arise from the transformation from mechanism according to Fig. 1 into a reaction driving gear according to Fig. 2, that is, in which the crank bearing is free, giving free mobility to the system.

Simple adjustability may be attained by making the buffers U¹ and U² of Fig. 11 or equivalent limiting means, adjustable along the path of oscillation. By causing the buffers U¹ and U² to approach each other the magnitude of the amplitude of the vibrations will be varied and by joint displacement of the buffers in one direction or the other, the location of the centre of oscillation will be varied. This control may be effected with very little expenditure of energy as the displacement of the buffers may be effected whilst the body V is underway or in a position intermediate the buffers.

The operation and working position of a reciprocating element such as a hack-saw reciprocated by the body V, can thus be varied to a considerable extent whilst the mechanism is in operation and without cessation of work.

Figure 13:
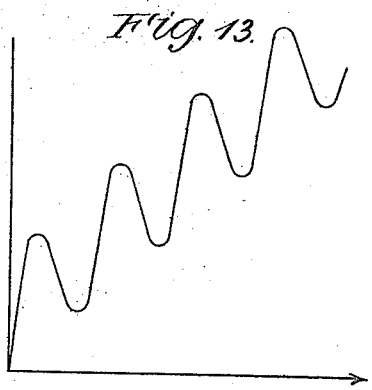

Complete utilization of the free location of the path of oscillation can be attained if the periodic forces acting on the reciprocating body V are used in conjunction with a force acting in one direction. A time-force diagram such as that illustrated in Fig. 12 is then obtained in which 1 represents the uni-directional, 11 periodic component and 111 the resultant force. From the resultant pulsating force 111, the diagram shown in Fig. 13 may be deduced, which represents a progressive pulsating movement. It will be understood that Fig. 13 only represents the general character or diagram of the path which will depend in form to a large extent on the useful work done. It gives, however, a good idea of the kind of movement even in the extreme case of a hammer where the whole work is performed in a single moment, namely by the blow. Fig. 13 illustrates the rising, falling and progressive movement such as that exhibited by a hammer when driving a pile or nail forwards or when shaping or forming the metal to be worked.

Figure 14:
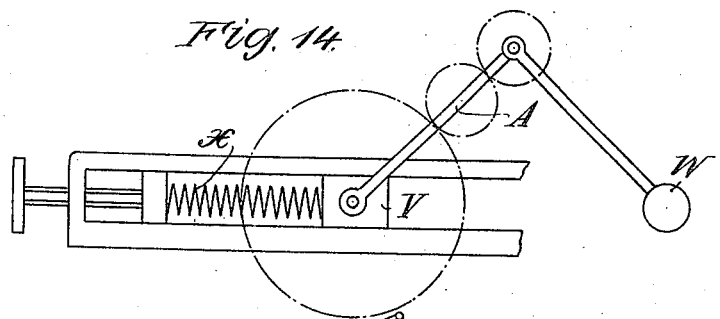
Fig. 14 illustrates a modification of the arrangement shown in Fig. 8.
Figure 15:
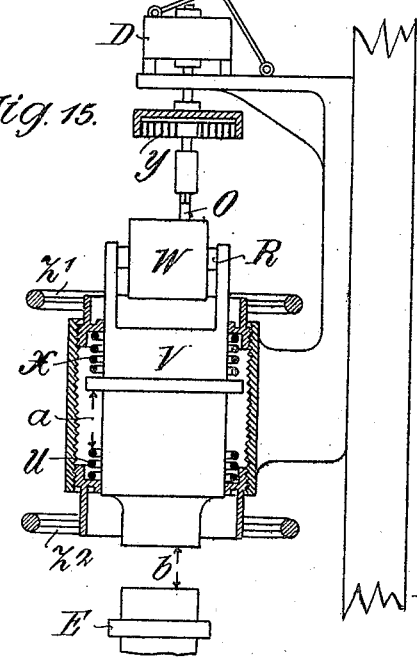
Fig. 15 is a side view (partly in section) illustrating the invention applied to a pile driver or other impact tool.

Fig. 14 is a diagrammatic illustration of the mechanism for producing a progressive oscillatory motion and Fig. 15 illustrates a practical example thereof.

Owing to the action of the spring X and the reciprocating weight W, a pulsating force acts upon the body V thus producing the progressive movement at the same time as the oscillation. In practice only the progressive component is of use, the oscillatory movement being an auxiliary movement which only indirectly assists or creates the progressive movement. This is clear from Fig. 15 which illustrates a pile driver where naturally the progression only of the pile is of importance, the pile constituting a unit with the driving tup V when the blow takes place. The spring X acts upon the tup V and is adjustable vertically by means of a hand wheel $Z^1$. The lower spring U is entirely inoperative when the pile driver is in complete operation, owing to the fact that the distance $a$ is greater than the height of the blow $b$. The spring U serves when necessary to limit or mitigate the blow for which purpose it may be vertically adjusted by means of a hand wheel $z^2$. The form of the reciprocating weight W here selected is that illustrated in Figs. 6 and 7. It is driven by the square shaft O which in turn is rotated by a spiral spring Y. The spring is wound up by the motor D, the object of this driving arrangement being hereinafter described.

When the tup rises, the tension on the spring X is increased and during the down stroke the tup V is not only thereby accelerated but also by the spring X so that it rebounds against the weight W. Both cooperate in such a manner, at the moment when the blow takes place, that the work in a progressive sense, that is, the velocity of the tup during the blow and thus the strength of the blow practically attains a maximum.

If the spring X is dispensed with, only the force of gravity acts on the tup V as a constant uni-directional force. There thus exists a peculiar case where no actual mechanical means limits the sphere of action of the reaction driving gear, thus in reality forming an example of continuous displacement of the centre of oscillation hereinbefore referred to.

The reaction driving gear has the characteristic that the turning moment on the driving shaft varies considerably throughout one revolution. It differs according to whether the reciprocating weight W is being retarded or accelerated. That this must be the case will be readily apparent from Fig. 2. Now if, as with a hammer, two successive amplitudes vary considerably, as in the case of the rise and fall of a hammer, or should there be a sudden dissipation of the energy as at the moment when the blow takes place, the maximum turning moment will become so great during one cycle that constructional parts such as shafts, toothed wheels, etc., are exposed to danger. It is therefore desirable in conjunction with the reaction driving gear to employ a driving means which will not permit the occurrence of high turning moments, but which will lag in angular velocity to such an extent that the exceptionally high maximum is avoided. The spring Y in Fig. 15 represents such a driving means which is interposed between the motor D and the shaft O. The spring Y, instead of being continuously wound up by the electro motor D may also be periodically wound up by any other suitable means. The spring as a driving means then constitutes a unit of the construction of the reaction driving gear and an important element thereof. In the case of a hammer the spring so acts that towards the end of the down stroke, the maximum angular velocity is attained and the blow is thus increased. The tup receives at the last moment a particularly strong impulse.

In the construction illustrated in Figs. 6 and 7 the masses are located in part in the excentrics therein used. The location within the excentrics of the masses required for the reaction may be carried to such an extent that the body no longer appears as such.

Claims—

1. Reciprocatory mechanism comprising a slidable, reciprocatory, revoluble driving member, an inertia element adapted to be reciprocated by said revoluble member and crank mechanism whereby the inertia of the inertia element reacts with the revoluble driving member to reciprocate said member, means being provided for utilizing the motion developed for doing external work.

2. In combination with reciprocatory mechanism as specified in claim 1, means for controlling the limits of travel of the reciprocatory member and consequent limits of travel of the inertia element.

3. Reciprocatory mechanism as specified in claim 1 in which progressive reciprocation step-by-step in one direction is obtained by means of unidirectional displacement of an adjustable buffer.

4. Reciprocatory mechanism comprising a driving shaft, an inner eccentric driven from said shaft, an outer eccentric mounted on the inner eccentric and a freely movable journal for said inner eccentric.

5. Reciprocatory mechanism comprising a driving shaft, a plurality of oppositely rotating inner eccentrics driven from said shaft, a plurality of outer eccentrics mounted on said inner eccentrics and a freely movable journal for said inner eccentrics.

6. Reciprocatory mechanism as specified in claim 5 having a weighted element supported by the outer excentrics.

RUDOLF GOLDSCHMIDT